United States Patent [19]

Strassberg

[11] Patent Number: 5,383,642
[45] Date of Patent: Jan. 24, 1995

[54] COMPUTER SCREEN ACCESSORY

[76] Inventor: Gerson Strassberg, 18 Engineers Rd., Roslyn Harbor, N.Y. 11576

[21] Appl. No.: 109,682

[22] Filed: Aug. 20, 1993

[51] Int. Cl.$^6$ .............................................. B41J 11/02
[52] U.S. Cl. ................................. 248/442.2; 248/452; 248/918; 400/718
[58] Field of Search ............... 248/442.2, 918, 924, 248/448, 452; 400/718, 718.1, 718.2

[56] References Cited

U.S. PATENT DOCUMENTS

| | | | |
|---|---|---|---|
| 4,475,705 | 10/1984 | Henneberg et al. | 248/447.2 |
| 4,619,429 | 10/1986 | Mazza | 248/447.2 |
| 4,632,471 | 12/1986 | Visnapuu | 248/442.2 X |
| 4,767,093 | 8/1988 | Jones | 248/442.2 |
| 5,009,382 | 4/1991 | Huffaker et al. | 248/284 |
| 5,035,392 | 7/1991 | Gross et al. | 248/284 |
| 5,074,512 | 12/1991 | Gianforcaro, II et al. | 248/442.2 |
| 5,082,235 | 1/1992 | Crowther et al. | 248/442.2 X |
| 5,122,941 | 6/1992 | Gross et al. | 248/442.2 X |
| 5,125,612 | 6/1992 | McNeal | 248/442.2 |
| 5,152,490 | 10/1992 | Deustsch | 248/452 |

Primary Examiner—Ramon O. Ramirez
Attorney, Agent, or Firm—Collard & Roe

[57] ABSTRACT

A device for retaining information sheets in close proximity to a display screen, including a frame member and a pair of leg members. A locking device releasably locks one of the leg members in discrete predetermined positions with respect to the frame member. A retention member is coupled to at least one of the leg members and the frame member for releasably retaining the information sheets. A clamp secures the device to the display screen, so that the information sheets are retained in close proximity to the display screen.

11 Claims, 2 Drawing Sheets

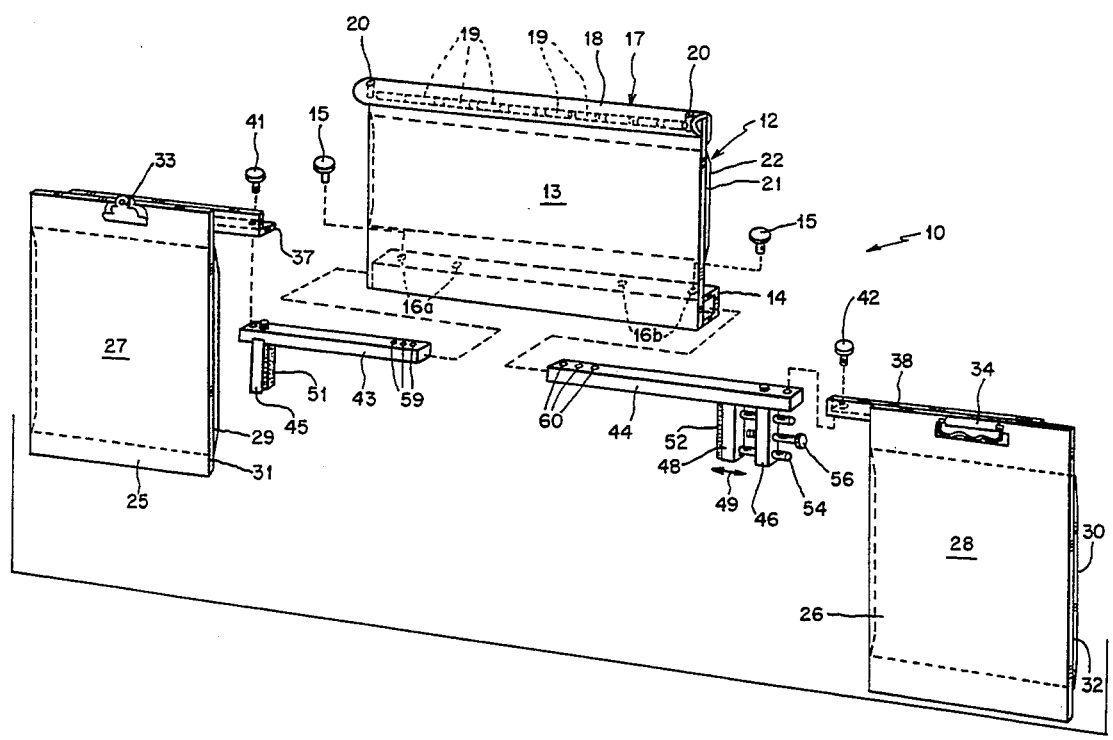

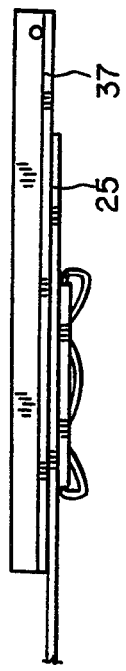
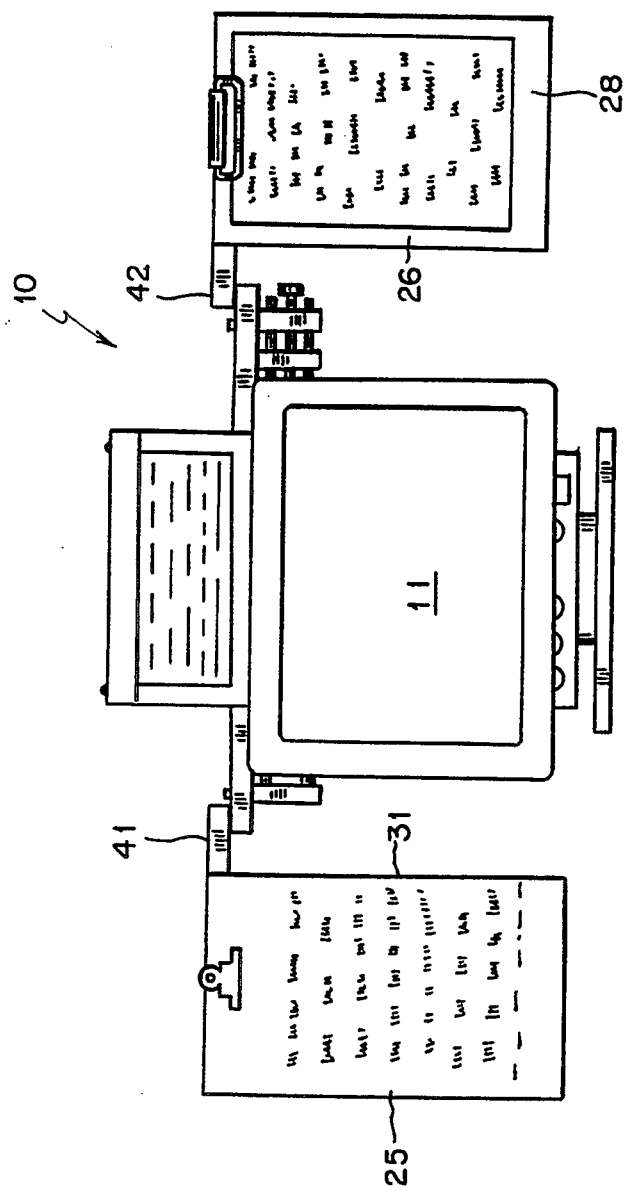
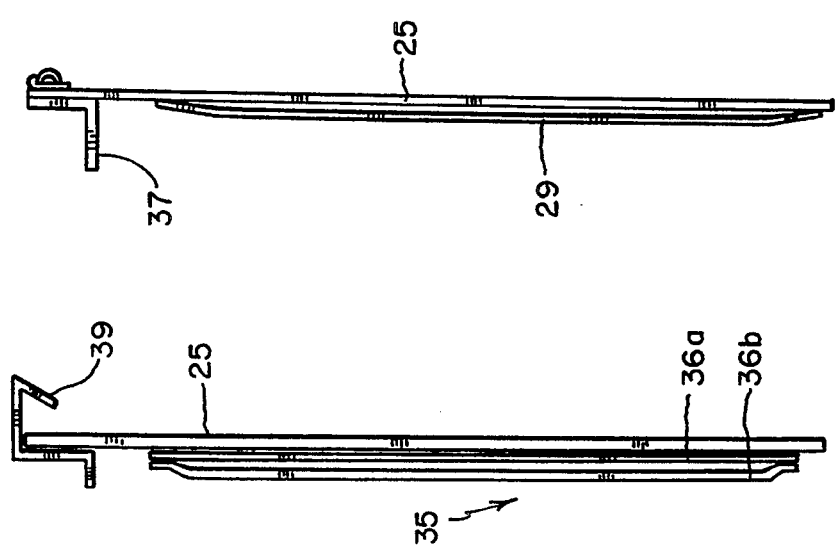

COMPUTER SCREEN ACCESSORY

BACKGROUND OF THE INVENTION

1. Field of the Invention

The present invention relates to a copy holder accessory for a computer screen. More particularly, the present invention relates to a copy holder accessory that can be easily installed and removed from a computer screen.

2. The Prior Art

In the operation of a computer work station, an operator visually scans a computer screen and frequently refers to instruction manuals and data input materials while inputting data and instructions to the computer keyboard. In a typical work station, the data display unit is a cathode ray tube (CRT) which is enclosed within a housing, with a keyboard situated immediately in front of the CRT display. The CRT display screen sits upon a desk or work table. Typically, a limited amount of space is available adjacent to the CRT.

In an attempt to provide a more efficient computer work station, certain attempts have been made to develop stand alone copy holders or copy holders which attach to the computer screen. U.S. Pat. No. 4,632,471 to Visnapuu, U.S. Pat. No. 5,125,612 to McNeal, U.S. Pat. No. 4,475,705 to Henneberg et al, U.S. Pat. No. 4,767,092 to Jones all disclose copy holders which display a single sheet either to the left or to the right of the computer screen. However, computer operators frequently must refer to numerous sheets of information or instructions and therefore, the copy holders, which can only display a single sheet at a time, are simply inadequate.

Further attempts have been made to provide copy holders in which more than one sheet may be retained adjacent to the computer screen. U.S. Pat. No. 5,035,392 to Gross et al, U.S. Pat. No. 5,074,512 to Gianforcaro, II et al, and U.S. Pat. No. 4,619,429 to Mazza all disclose devices for displaying numerous sheets of information adjacent to the computer screen. However, these references do not disclose a copy holder for displaying three sheets of information adjacent the computer screen, where the two side panels can pivot back, flat against the side of the computer screen when not in use. In addition, the prior art does not disclose a multi-layered display panel for retaining semi-permanent information on one layer and displaying temporary information, on a more accessible, second layer.

Therefore, it would be advantageous to have a computer terminal accessory which can be easily installed or removed from any size computer terminal. In addition, it would be desirable to have a computer screen accessory that had three display panels adjacent the computer screen. Furthermore, it would be advantageous for some or all of the display panels to have a first pocket for storing permanent or semi-permanent information, for example telephone number listings or instructions for computer programs, and a second retention zone that overlies the information stored within the pocket. Temporary information, for example, copy or information to be entered into the computer, can be temporarily retained in front of the permanent or semi-permanent information.

SUMMARY OF THE INVENTION

It is therefore an object of the present invention to provide a computer screen accessory which overcomes the drawbacks of the prior art and can be quickly and easily installed and removed from any size computer screen.

It is a further object of the present invention to provide a computer screen accessory which has multiple panels for storing the information adjacent the computer screen.

It is another object of the present invention to provide a computer screen accessory, where each panel includes a pocket for storing permanent or semi-permanent information.

It is yet another object of the present invention to provide a computer screen accessory in which each panel has a clip for retaining information in front of the pocketed information.

These and other related objects according to the invention are achieved by a device for retaining information sheets in close proximity to a display screen, including a frame member and a pair of leg members. Locking means releasably lock one of the leg members in discrete predetermined position with respect to the frame member. Retention means are coupled to at least one of the leg members and the frame member for releasably retaining the information sheets. The device further includes means for clamping the device to the display screen, so that the information sheets are retained in close proximity to the display screen. The retention means include a rigid translucent panel with a front surface for mounting temporary information sheets and a rear surface. The retention means further include a flexible sheet attached to the rear surface and forming a pocket for receiving semi-permanent or permanent information sheets.

One panel is coupled to the frame member for retaining semi-permanent and temporary information sheets generally above the display screen, and one panel is coupled to each of the leg members for retaining semi-permanent and temporary information sheets generally to either side of the display screen. The display screen has a top, and the frame member has a horizontal extending axis, generally parallel to the display screen top. One of the leg members is movable along the horizontally extending axis. The clamping means includes a clamping block coupled to one of the leg members and movable in a direction parallel to the horizontal axis between the leg members, for clamping the device to the display screen.

In an alternate embodiment of the invention, both leg members are movable in a direction parallel to the horizontal axis. The locking means individually and releasably lock each of the leg members in discrete predetermined positions in respect to the central frame member. The clamping means further include a rod attached to the clamping block and a bore disposed within one of the leg members for receiving the rod and guiding movement of the clamping block. The clamping means further include a threaded member and a cooperatively sized threaded hole disposed within the one leg member having the bore, wherein the threaded member rotates within the threaded hole to adjust the position of the clamping block.

In a further embodiment, there is disclosed a device for retaining information sheets in close proximity to a display screen having a top and two sides. The device includes a tubular support member having a substantially rectangular cross-section disposed adjacent the top of the display screen. The support member has spaced opposite open ends, an upper surface with a plurality of spaced holes formed through the upper surface and a front surface disposed within a plane substantially parallel to the display screen. A rigid translucent planar document holder is attached to the front surface of the support member and extends upwardly away from the display screen in a plane substantially parallel to the display screen. The document holder has a rear surface, a top edge and a front surface.

A sheet is affixed to the rear surface of the document holder along two lines parallel to the top of the display screen to form a pocket between the sheet and the document holder for storing semi-permanent information sheets with the information adjacent the document holder, in a manner, whereby the information is displayed generally above the display screen. A clip is attached to the front surface of the document holder adjacent the top edge of the document holder for releasably retaining information sheets adjacent the front surface of the document holder.

A pair of adjusting members are partially positioned in the support member for substantially axial movement therein. Each of the adjusting members has a substantially rectangular cross-section corresponding to the inner dimensions of the support member for mating with the support member. Each of the adjusting members has a plurality of bores formed therein in alignment with the plurality of holes formed through the upper surface of the support member. A pair of pegs is adapted to extend through the holes formed through the upper surface of the support member and into corresponding bores formed in each of the adjusting members for releasably locking the adjusting members in predetermined positions relative to the support member.

An arm is affixed to the corresponding adjusting member in the areas of the adjusting members outside the support member. The arms extends substantially coplanarly with the document holder downwardly substantially adjacent the sides of the display screen. A clamping arm is adjustably coupled to one of the arms for guided movement with the arms and the adjusting members to which the arm is affixed in directions towards and away from the other arm. The clamping arm and the other arm engage the two sides of the display screen to support the device contiguous to the top of the display screen.

A pair of translucent side panels is removably, pivotally coupled to the adjusting members adjacent the two sides of the display screen. Each of the side panels have a rear surface with a clear sheet affixed to the rear surface forming a pocket for storing semi-permanent data sheets. Each side panel has a front surface with a clip attached thereto for retaining temporary data sheets adjacent the front surface. Each of the side panels has a substantially L-shaped cross section support bracket attached to the rear surface thereof. The support bracket has a member substantially perpendicular to the side panel for pivotally coupling the support bracket to the corresponding adjusting member.

BRIEF DESCRIPTION OF THE DRAWINGS

Other objects and features of the present invention will become apparent from the following detailed description considered in connection with the accompanying drawing which discloses two embodiments of the present invention. It should be understood, however, that the drawing is designed for the purpose of illustration only and not as a definition of the limits of the invention.

In the drawing, wherein similar reference characters denote similar elements throughout the several views:

FIG. 1 is an exploded view of an embodiment of a computer screen accessory according to the invention;

FIG. 2A is a left side elevational view of a side panel from the computer screen accessory;

FIG. 2B is a left side elevational view of an alternate embodiment of a side panel;

FIG. 3 is a top plan view of the side panel;

FIG. 4 is a front side elevational view of the computer screen accessory mounted on a computer screen.

DETAILED DESCRIPTION OF PREFERRED EMBODIMENTS

Referring now in detail to the figures and in particular FIG. 1, there is shown a computer screen accessory for retaining information sheets or copy adjacent a computer screen. Computer screen accessory 10 generally includes a central display unit 12 and side display units 25 and 26. Central display unit 12 includes a central panel 13 mounted on a tubular frame member 14 which rests along a top surface of the computer screen. A set of pegs 15 fit within cooperatively shaped bores 16 in order to adjust the computer screen accessory 10 to differently sized computer screens, as will be explained in greater detail below.

Along the top of central panel 13, there is a clip 17 which extends over the top of central panel 13 and is affixed to the backside of central panel 13, i.e. glued or riveted. Clip 17 is formed as a substantially C-shaped plate 18 which extends outwardly and downwardly adjacent the front side of central panel 13. The downwardly curved portion of C-shaped plate 18 bends back toward the front surface of central panel 13 forming an inverted triangular space. A set of cylindrical rollers 19 are disposed within this inverted triangular space.

Sheets of paper are slid along the front surface of central panel 13 up into the inverted triangular space. As the paper contacts cylindrical rollers 19, the rollers are moved upwardly as the paper slips between the rollers and the front surface of central panel 13. Thereafter, cylindrical rollers 19 move back down into the narrow portion of the inverted triangular space and effectively "clamp" the sheet against the front surface of central panel 13. To release the sheet, it is lifted upwardly from the bottom of the sheet to disengage it from rollers 19. Two pins 20 are located at either end of C-shaped plate 18 to retain cylindrical rollers 19 within the inverted triangular space.

Adjacent the rear side of central panel 13, there is a pocket 21 enclosed by a flap 22. Flap 22 is attached to the rear side of central panel 13 along two parallel lines. Flap 22 can be affixed to central panel 13 in any manner, for example, glued or RF welded. Permanent or semi-permanent information, for example, information which will not change for several weeks or several months is placed into pocket 21. Other temporary or transitional data is placed adjacent the front of central panel 13 and is retained by clip 17. Although, the information adjacent the front side of central panel 13 will temporarily obscure the more permanent information stored within pocket 21, the temporary data sheet can simply be flipped up or removed as necessary to access the more permanent data.

To either side of the computer screen there is located a side display unit 25 and 26. Side display units 25 and 26 include side panels 27 and 28 equipped with flaps 29 and 30 along the backside of side panels 27 and 28, forming pockets 31 and 32. Clips 33 and 34 are located adjacent the top end of side panels 27 and 28. Clip 33 is a standard spring-loaded clipboard type clip, while clip 34 is of slightly different design, having a thin rod that is spring biased against the front surface of side panel 28. It should be understood that central panel 13 and side panels 27 and 28 may each be equipped with any combination of clips. Three different clip types, i.e. clip 17, clip 33 and clip 34, are merely shown as exemplary clip types.

Along the top rear side of side panels 27 and 28, there is included an L-shaped bracket 37 and 38 disposed generally behind clips 33 and 34. Brackets 37 and 38 extend approximately across the entire width of side panels 27 and 28, although alternate configurations are also possible. Brackets 37 and 38 are attached to the rear side of side panels 27 and 28 by gluing, for example. The free ends of brackets 37 and 38 include openings to receive cooperatively sized posts 41 and 42 which connect side panels 27 and 28 to adjusting arm 43 and 44, respectively.

Adjusting arms 43 and 44 include downwardly extending leg members 45 and 46. Leg member 45 and 46 are rigidly affixed to adjusting arms 43 and 44. Leg member 46 is coupled to a clamping arm 48 that is adapted for guided movement in directions 49. Leg member 45 and clamping arm 48 are provided with padding 51 and 52, for example, soft foam rubber padding, for engaging the sides of the computer screen. The rubber padding may be retained in slots in leg member 45 and clamping arm 48 to prevent shifting during use. Clamping arm 48 includes guide rods 54 which extend through a clearance hole in leg member 46. Guide rods 54 direct and limit the degree to which clamping arm 48 can move in directions 49. A screw member 56 is threadingly engaged in a cooperatively sized bore within leg member 46. Clockwise rotation of screw member 56 forces clamping arm 48 toward leg member 45 to securely clamp computer screen accessory 10 onto the computer screen.

Adjusting arms 43 and 44 have outer dimensions slightly smaller than the opening within frame member 14, whereby adjusting arms 43 and 44 are adapted for longitudinal movement within frame member 14. The free ends of adjusting arms 43 and 44, that are disposed within frame member 14, are equipped with bores 59 and 60. Bores 16a are aligned with bores 59, and bores 16b are aligned with bores 60 with pegs 15 engaging the two sets of concentric bores to hold adjusting arms 43 and 44 in place with respect to frame member 14.

In order to assemble and install computer screen accessory 10, screw member 56 is completely retracted and clamping arm 48 is slid with the assistance of guide rods 54, adjacent to leg member 46. Adjusting arms 43 and 44 are positioned within clear frame member 14 and are pushed together until leg member 45 and clamping arm 48 touch the sides of the computer screen. Adjusting arms 43 and 44 are then retracted by the least amount necessary to line up one of bores 16a with one of bores 59 and one of bores 16b with one of bores 60. Frame member 14 is constructed of a clear material to facilitate the visual alignment of the bores. Pegs 15 are then placed through the aligned bores to lock adjusting arms 43 and 44 in a position that is slightly larger than the width of the computer screen. Screw member 56 is then rotated to force clamping arm 48 toward leg member 45. Clamping arm 48 and leg members 45 squeeze against the sides of the computer screen, as padding 51 and 52 compresses slightly.

Although frame member 14 is shown with two bores on either end, a larger or smaller number of bores may be provided. Similarly, although three bores 59 and three bores 60 are shown on the ends of adjusting arms 43 and 44, any number of bores may be provided. A possible configuration places bores 16a three inches away from each other and bores 16b three inches away from each other. Bores 59 are located one inch away from each other and bores 60 are also located one inch away from each other. This would allow each adjusting arm to be adjusted through a range of six inches, giving a total range of twelve inches. Such an arrangement could easily accommodate any size computer screen from twelve inches up to twenty-four inches. With a one inch incremental difference between the discrete positions selected by bores 16, 59 and 60, guide rod 54 and screw member 56 are provided with a $1\frac{1}{4}$ of an inch travel length. This would allow fine adjustment to any width between the discrete positions as determined by bores 16, 59 and 60.

FIGS. 2A and 3 show side display unit 25 with flap 29 and bracket 37. FIG. 4 shows the assembled computer screen accessory 10 mounted along the top edge of a computer screen 11. Side display unit 25 shows a sheet of information placed within pocket 31. Side display unit 26 shows a sheet of information mounted adjacent the front side of side panel 28. Side display units 25 and 26 may be pivoted about posts 41 and 42 into a position that is most comfortable for the computer operator. If one or both of side display units 25 or 26 is not being used, they may be pivoted back parallel to the side of computer screen 11. FIG. 2B shows a further side display unit 25 having a combined bracket and clip 39 formed as a unitary structure. A double-layer pocket 35 is made by connecting sheets 36a and 36b together, for example, by RF welding. Sheet 36a is then bonded, e.g. glued, to the rear of side display unit 25.

While several embodiments of the present invention have been shown and described, it is to be understood that many changes and modifications may be made thereunto without departing from the spirit and scope of the invention as defined in the appended claims.

What is claimed is:

1. A device for retaining information sheets in close proximity to a display screen comprising:
   a frame member;
   a pair of adjusting members;
   locking means for releasably locking one of said adjusting members in discrete predetermined positions with respect to said frame member;
   retention means coupled to at least one of said adjusting members and said frame member for releasably retaining the information sheets; and
   means for clamping the device to the display screen, so that the information sheets are retained in close proximity to the display screen.

2. The device for retaining information sheets according to claim 1, wherein said retention means comprises:
   a multilayered display panel having a first planar retention zone and a second planar retention zone disposed generally parallel to said first planar retention zone;
   said first planar retention zone holding and displaying information sheets of a first type; and said second planar retention zone holding and displaying information sheets of a second type in overlying relationship to said information sheets of said first type.

3. The device for retaining information sheets according to claim 1, wherein said retention means comprises:
   a rigid translucent panel with a front surface for mounting temporary information sheets and a rear surface; and
   a flexible sheet attached to said rear surface and forming a pocket for receiving semi-permanent information sheets.

4. The device for retaining information sheets according to claim 3, wherein one panel is coupled to said frame member for retaining semi-permanent and temporary information sheets generally above the display screen and one panel is coupled to each of said adjusting members for retaining semi-permanent and temporary information sheets generally to either side of the display screen.

5. The device for retaining information sheets according to claim 4, wherein the display screen has a top and said frame member has a horizontally-extending axis generally parallel to the display screen top and one of said adjusting members is movable along the horizontally-extending axis.

6. The device for retaining information sheets according to claim 5, wherein said clamping means comprises:
   a pair of leg members connected to said pair of adjusting members; and
   a clamping block coupled to one of said leg members and movable in a direction parallel to the horizontally-extending axis between said leg members, for clamping the device to the display screen.

7. The device for retaining information sheets according to claim 6, wherein both of said leg members are movable in a direction parallel to said horizontally-extending axis.

8. The device for retaining information sheets according to claim 7, wherein said locking means individually and releasably locks each of said leg members in discrete predetermined positions with respect to said frame member.

9. The device for retaining information sheets according to claim 8, wherein said clamping means further comprises:
   a rod attached to said clamping block and a bore disposed within one of said leg members for receiving said rod and guiding movement of said clamping block.

10. The device for retaining information sheets according to claim 9, wherein said clamping means further comprises:
    a threaded member and a cooperatively sized threaded hole disposed within the one leg member having the bore, wherein said threaded member rotates within said threaded hole to adjust the position of said clamping block.

11. A device for retaining information sheets in close proximity to a display screen having a top and two sides, said device comprising:
    a tubular support member having a substantially rectangular cross section disposed adjacent the top of the display screen, said support member having spaced opposite open ends, an upper surface with a plurality of spaced holes formed through said upper surface and a front surface in a plane substantially parallel to the display screen;
    a rigid translucent planar document holder attached to the front surface of said support member and extending upwardly away from the display screen in a plane substantially parallel to the display screen, said document holder having a rear surface, a top edge and a front surface;
    a flexible sheet affixed to the rear surface of said document holder along two lines parallel to the top of said display screen and forming a pocket between said sheet and said document holder for storing semi-permanent information sheets with the information adjacent said document holder in a manner whereby said information is displayed generally above said display screen;
    a clip attached to the front surface of said document holder adjacent the top edge of said document holder for releasably retaining information sheets adjacent said front surface of said document holder;
    a pair of adjusting members partially positioned in said support member for substantially axial movement therein, each of said adjusting members having a substantially rectangular cross section corresponding to the inner dimensions of said support member for mating with said support member, each of said adjusting members having a plurality of bores formed therein in alignment with said plurality of holes formed through said upper surface of said support member;
    a pair of pegs adapted to extend through said holes formed through said upper surface of said support member and into corresponding bores formed in each of said adjusting members for releasably locking said adjusting members in predetermined positions relative to said support member;
    a pair of legs each affixed to a corresponding one of said adjusting members in the areas of said adjusting members outside said support member and extending substantially coplanarly with said document holder downwardly substantially adjacent the sides of the display screen;
    a clamping arm adjustably coupled to one of said legs for guided movement with said one of said legs and the one of said adjusting members to which said leg is affixed in directions toward and away from said other of said legs, said clamping arm and said other of said legs engaging the two sides of said display screen to support said device contiguous to the top of said display screen; and
    a pair of translucent side panels removably pivotally coupled to said adjusting members adjacent the two sides of said display screen, each of said side panels having a rear surface with a flexible sheet affixed to said rear surface forming a pocket for storing semi-permanent data sheets and having a front surface with a clip attached thereto for retaining temporary data sheets adjacent said front surface, each of said side panels having a substantially L-shaped cross section support bracket attached to said rear surface thereof, said support bracket having a member substantially perpendicular to said side panel for pivotally coupling said support bracket to the corresponding adjusting member.

* * * * *